(12) United States Patent
Miller

(10) Patent No.: US 8,689,821 B2
(45) Date of Patent: Apr. 8, 2014

(54) AIR RELEASE VALVE

(76) Inventor: James Douglas Miller, Munster (ZA)

( * ) Notice: Subject to any disclaimer, the term of this patent is extended or adjusted under 35 U.S.C. 154(b) by 640 days.

(21) Appl. No.: 12/920,814

(22) PCT Filed: Feb. 24, 2009

(86) PCT No.: PCT/IB2009/050735
§ 371 (c)(1),
(2), (4) Date: Dec. 7, 2010

(87) PCT Pub. No.: WO2009/109871
PCT Pub. Date: Sep. 11, 2009

(65) Prior Publication Data
US 2011/0146811 A1   Jun. 23, 2011

(30) Foreign Application Priority Data
Mar. 3, 2008  (ZA) ................................. 2008/02013

(51) Int. Cl.
*F16K 31/18*   (2006.01)

(52) U.S. Cl.
USPC .......................................... 137/430; 137/423

(58) Field of Classification Search
USPC ............... 137/38, 39, 43, 202, 409, 417, 423, 137/428, 429, 430, 433, 574, 412, 413; 222/68; 251/127
See application file for complete search history.

(56) References Cited

U.S. PATENT DOCUMENTS

| | | | |
|---|---|---|---|
| 4,243,066 A * | 1/1981 | Lambie | 137/202 |
| 4,586,528 A | 5/1986 | Andres et al. | |
| 5,215,132 A * | 6/1993 | Kobayashi | 137/587 |
| 5,392,804 A * | 2/1995 | Kondo et al. | 137/202 |
| 5,511,577 A | 4/1996 | Richards et al. | |
| 6,035,884 A * | 3/2000 | King et al. | 137/202 |
| 6,557,578 B2 * | 5/2003 | Shimamura et al. | 137/202 |
| 2009/0194170 A1* | 8/2009 | Martin et al. | 137/202 |

FOREIGN PATENT DOCUMENTS

| | | |
|---|---|---|
| GB | 1440529 | 6/1976 |
| JP | 2004-278573 | 10/2004 |
| WO | WO-01/84027 A1 | 11/2001 |

OTHER PUBLICATIONS

International Search Report for PCT/IB2009/050735 dated May 29, 2009.
Written Opinion for PCT/IB2009/050735 dated May 29, 2009.
Extended European Search Report issued on May 3, 2013 in corresponding European Patent Application No. 09717378.5, 6 pages.

* cited by examiner

*Primary Examiner* — Craig Schneider
*Assistant Examiner* — Craig J Price
(74) *Attorney, Agent, or Firm* — Duane Morris LLP

(57) ABSTRACT

The air release valve 10 includes an elongate valve body 12 including an elongate pipe section 14 that has a top wall 16 and a bottom wall secured to opposite ends thereof, thus defining a cylindrical internal chamber 20 within the valve body 12. The valve body 12 further includes a baffle plate arrangement 22 dividing the internal chamber 20 into a top part 24 and a bottom part 26. The bottom wall 18 of the valve body 12 defines an inlet 38 which is connectable to a water pipeline 69. The top wall 16 defines an outlet 40 which operatively communicates with the atmosphere. A valve seat 42, including an O-ring seal 44, surrounds the outlet 40 and permits blocking of the outlet 40 by a valve closure 46, which in combination with a float 48, forms a valve closure arrangement 50 of the air release valve 10.

18 Claims, 5 Drawing Sheets

AIR RELEASE VALVE

This application is a National Stage Application under 35 U.S.C. §371 of International Application No. PCT/IB2009/050735, filed on Feb. 24, 2009 which claims the benefit of priority to South African Application No. 2008/02013 filed on Mar. 3, 2008. The disclosures of both are incorporated herein by reference as if set forth in their entireties.

FIELD OF INVENTION

THIS INVENTION relates to an air release valve.

BACKGROUND TO INVENTION

The invention relates particularly to an air release valve of a type that can be used in conjunction with a water pipe line. It is known in relation to a water pipeline that it is often required to purge the pipeline of air present therein. Such air particularly may be present within the pipeline before water flow through the pipeline is initiated, i.e. when the pipeline is empty. Also, during flow of water through the pipeline, air in suspension in the water and pockets of air in the pipeline may collect in certain regions of the pipeline, typically peak regions and certain substantially flat sections.

An air release valve that provides for the release of air from a water pipeline, in its simplest form, includes an elongate valve body that defines a passage therethrough, along a longitudinal axis thereof that leads from an inlet end to an outlet end. The valve body is operatively mounted on a pipeline, particularly so that the inlet end of the passage communicates with the pipeline and the passage itself is substantially vertically disposed and leads upwardly to the outlet end thereof. The valve body defines a valve seat at the outlet end of the passage. The valve also includes a valve closure arrangement within the passage, the arrangement including a float that serves as a valve closure also. The float is axially displaceable within the passage defined by the valve body, particularly between a closed position, in which it seats against the valve seat, and variable open positions, in which it is spaced from the valve seat to expose the valve outlet. The open positions of the float are below its closed position.

In relation to a water pipeline having an air release valve of the above type mounted thereon in a suitable location for the release of air from the pipeline, in an initial condition of the pipeline, it is devoid of water and filled with air at substantially atmospheric pressure. In this initial condition the float is in an open position. When water is pumped into the pipeline, upstream of the valve, the advancing water pressurises the air in the pipeline downstream of the water. Air then initially passes through the air release valve, particularly past the float via a flow passage defined between the float and the surrounding valve body, the air escaping via the outlet of the valve body to the atmosphere. The air flow past the float may create a low pressure region above the float such as to cause it to be abruptly lifted into its closed position, thereby abruptly closing the valve outlet. Such closing of an air release valve is sometimes referred to as "premature closing" and may cause water hammer in the associated pipeline. Should the float not be lifted into its closed position under such air flow, water entering into the passage defined within the valve body, when air release is being completed, will induce upward displacement of the float, particularly until it reaches its closed position when air release is at least substantially complete. Such closure of the valve can occur abruptly and again may cause water hammer in the pipeline.

Insofar as further elements of an air release valve of the above and similar types are well known, they are not described in further detail herein.

Water hammer as may occur in conjunction with the use of an air release valve of the above type may result in damage to a pipeline, e.g. a burst. As such, it has been an object to provide an air release valve in conjunction with the use of which, the problem of water hammer is at least ameliorated.

A known new valve closure arrangement for use in an air release valve of the above type provides for a float and a valve closure that are displaceable towards and away from each other between an abutting position and variable spaced apart positions. In the abutting position, abutment particularly occurs within an area which is small, compared to the maximum cross-sectional area of the float in a horizontal plane, so that substantially the entire top surface of the float is exposed to the fluid pressure in the passage in the valve. The closure itself is biased downwards by gravity, i.e. to open. An upper limit position of the float is thus defined when the valve closure is in its closed position and the float abuts against the closure. The float is displaceable between this upper limit position and a lower limit position, through a range of intermediate positions. Also, an air flow passage is defined between the operative top and bottom of the closure, the passage having an inlet within the said area within which abutment occurs between the float and the closure, and an outlet that communicates with the atmosphere. With the float abutting against the closure, the air flow passage defined through the closure is blocked-off by the float. With the float spaced apart from the closure, the air flow passage is open. Insofar as the features of this new closure arrangement also are known, they are not described in future detail herein.

Although use of this known new valve closure arrangement within an air release valve has been advantageous, a solution to the water hammer problems was not achieved and it is thus an object of this invention to at least ameliorate the water hammer problems.

SUMMARY OF INVENTION

According to the invention there is provided an air release valve which includes, in its operative upright configuration, an elongate valve body defining an internal chamber therein along a longitudinal axis thereof between a top wall, that defines an outlet and a valve seat surrounding the outlet, and a bottom wall, that defines an inlet connectable in communication with a water pipeline, the body having a baffle plate arrangement located therein that divides the internal chamber into a top part and a bottom part and that defines a passage which provides for fluid communication between the parts;

a valve closure arrangement including a float and a closure that are located for axial displacement within the top part of the internal chamber and that are configured to permit fluid flow from the passage defined by the baffle plate arrangement past the float and the closure, the float and the closure being displaceable between an upper limit position, in which the closure blocks the outlet defined by the top wall of the valve body by seating against the valve seat and the float bears against the closure, and a bottom limit position, in which the closure and the float are displaced away from the outlet; and a regulator float that is located for axial displacement within the bottom part of the internal chamber and that is configured to permit fluid flow from the inlet defined by the bottom wall of the valve body past the regulator float to the passage defined by the baffle plate arrangement, the regulator float being displaceable between a first position, in which substantially free flow through the passage defined by the baffle plate arrangement is permitted, and a second position, in which the fluid flow is restricted.

The elongate valve body of the air release valve of the invention may include an elongate pipe-like section within which the internal chamber is defined and which has plate elements secured at opposite ends thereof that form, respectively, the top wall and the bottom wall of the valve body, thereby to define a cylindrical internal chamber.

The baffle plate arrangement of the air release valve may include a pair of plates located in a substantially parallel, spaced configuration within the pipe-like section, substantially perpendicular to the longitudinal axis of the valve body, the pair of plates including an operative upper plate in the form of a circular disc having a diameter smaller than the diameter of the pipe section, and an operative lower plate, in the form of a circular disc that spans the pipe section and that defines a central aperture therethrough, whereby in use the baffle plate arrangement and pipe section defines a passage through which fluid flows through the central aperture defined in the bottom plate of the baffle plate arrangement, then radially outwardly between the plates and then upwardly through the annular space defined between the outer perimeter of the upper plate and the pipe-like section.

The valve body may include closure arrangement guide means for guiding the axial displacement of the float and of the closure of the valve closure arrangement, the float and the closure being configured to define an annular space around them for fluid flow from the baffle plate arrangement to the outlet defined in the top wall of the valve body. The bottom limit position of the closure and the float may be determined by the position of the top baffle plate, with the float resting on the top baffle plate in said bottom limit position.

Further according to the invention, the configuration of the float and of the closure of the valve closure arrangement may be such that with the float abutting the closure, abutment occurs within an area which is relatively small compared to the maximum cross-sectional area of the float in a horizontal plane, providing for substantially the entire top surface of the float to be exposed to fluid pressure acting in the passage in the valve. The closure may define an air flow passage defined between the operative top and bottom of the closure, the passage having an inlet within said area within which abutment occurs between the float and the closure, and an outlet that communicates with the atmosphere via the outlet defined by the top wall of the valve body.

The regulator float of the air release valve may be have a cylindrical configuration and a diameter larger than the diameter of the aperture that is defined in the lower baffle plate, the second position of the regulator float restricting fluid flow through the aperture in the lower baffle plate.

The air release valve also may include regulator float guide means for guiding the axial displacement of the regulator float. The regulator float guide means may comprise a shaft on which the regulator float is slidably displaceable and which extends from the top baffle plate of the baffle plate arrangement operatively downwards through the aperture in the bottom baffle plate and into the bottom part of the internal chamber defined within the valve body. The regulator float guide means may include a first stop located at the operative free end of the shaft determining, in use, the first position of the regulator float and a second stop located on the shaft intermediate the first stop and the top baffle plate determining, in use, the second position of the regulator float.

The regulator float may comprise two parts which are different mass and which are releasably connected to one another.

BRIEF DESCRIPTION OF THE DRAWINGS

Further features of the invention are described hereinafter by way of a non-limiting example of the invention, with reference to and as illustrated in the accompanying diagrammatic drawings. In the drawings.

DESCRIPTION OF PREFERRED EMBODIMENTS

Figure 1:
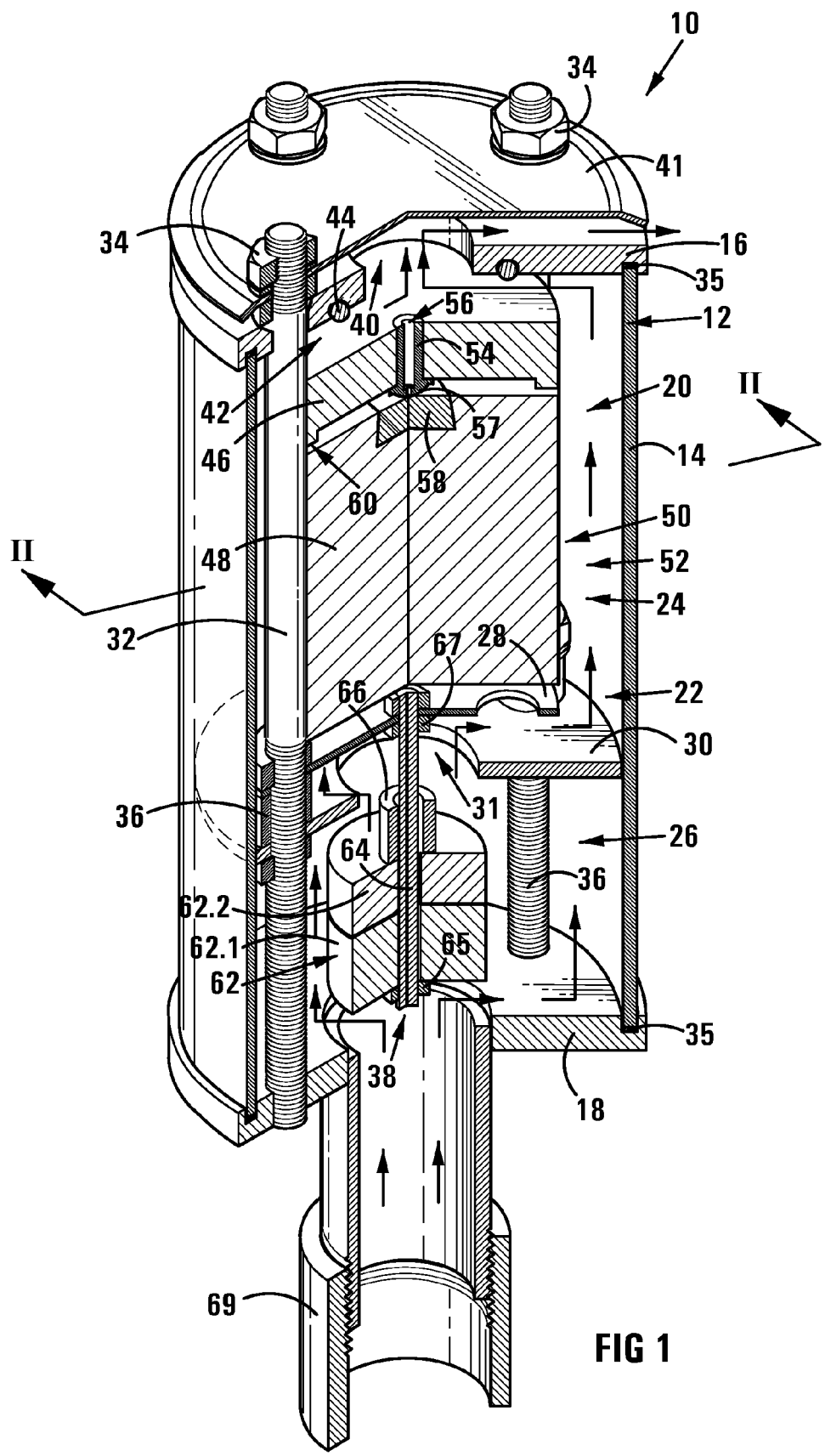
FIG. 1 shows a perspective and partly sectional view of an air release valve in accordance with the invention.

Referring to the drawings, an air release valve, in accordance with the invention, is designated generally by the reference numeral 10. The air release valve includes an elongate valve body 12 that defines a longitudinal axis, the valve body 12 including an elongate pipe section 14 that has a top wall 16 and a bottom wall 18 secured to opposite ends thereof, thus defining a cylindrical internal chamber 20 within the valve body 12.

The valve body 12 further includes a baffle plate arrangement 22 that is located therein between opposite ends thereof, the baffle plate arrangement 22 dividing the internal chamber 20 into a top part 24 and a bottom part 26. The baffle plate arrangement 22 includes an upper baffle plate 28, which is in the form of a circular disc having a diameter smaller than the internal diameter of the pipe section 14, and a lower baffle plate 30, which spans the pipe section 14 and which defines a central aperture 31 therethrough. An arrangement of bolts 32, nuts 34 and spacers 36 (only some shown) provide for the effective assembly of the valve body 12 in the configuration described and is clearly illustrated in the drawings. The elongate pipe section 14 is received within a circumferential groove defined in the top wall 16 and the bottom wall 18, and within which a sealing gasket 35 is located, thereby forming a fluid-tight seal therewith. Insofar as the assembly of the valve body 12 can be varied in many different respects, this is not described in further detail herein.

The bottom wall 18 of the valve body 12 defines an inlet 38 which is connectable in communication with a water pipeline 69, optionally via a suitable isolating valve (not shown) whereby the air release valve can be isolated from the pipeline. The top wall 16 defines an outlet 40 which operatively communicates with the atmosphere, either directly (not shown) or via an elbow section as shown whereby the outlet is to some extent shielded by a cover plate 41 against debris entering the valve body 12. A valve seat 42, including an O-ring seal 44, surrounds the outlet 40 and permits blocking of the outlet 40 by a valve closure 46 which, in combination with a float 48, forms a valve closure arrangement 50 of the air release valve 10.

Figure 2:
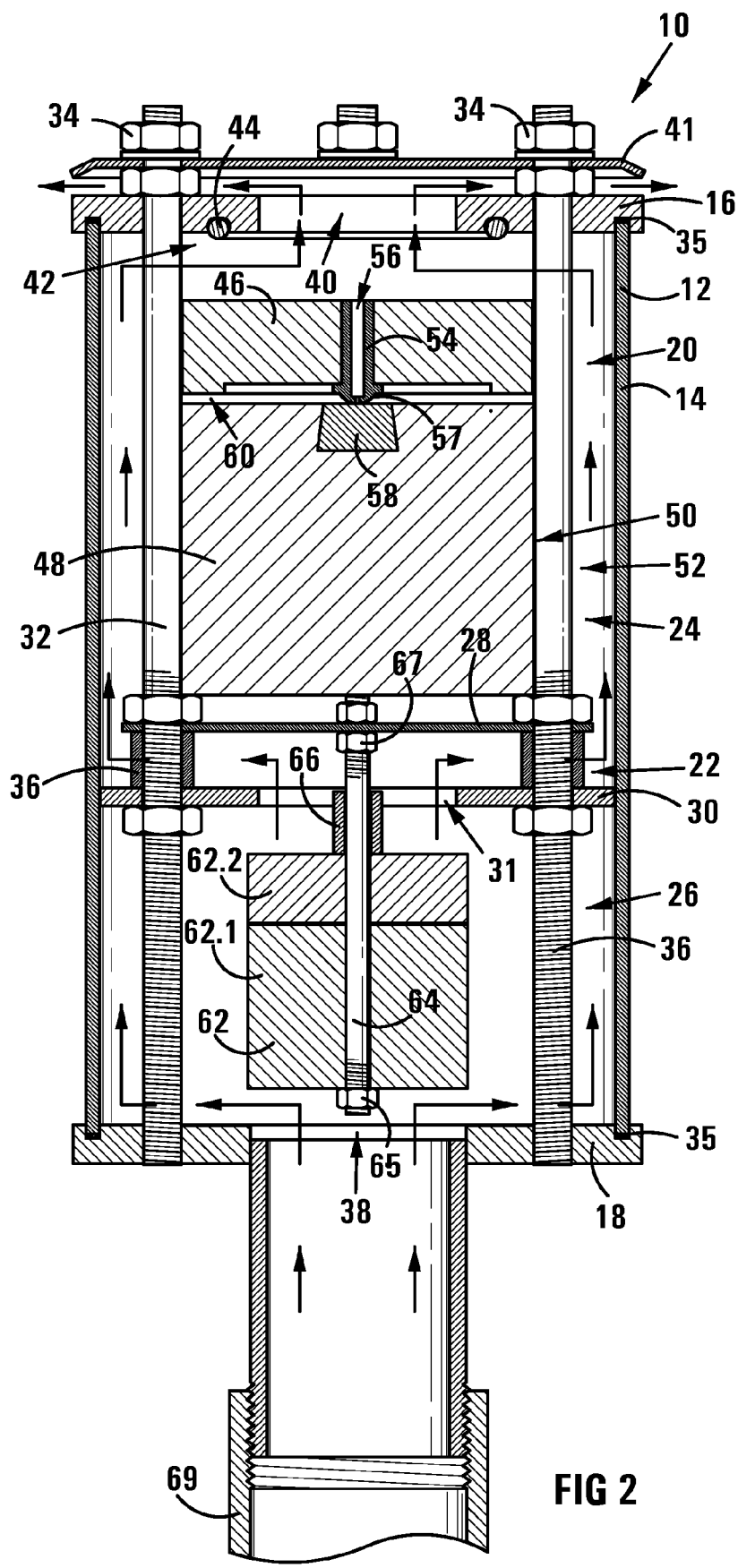
FIG. 2 shows a sectional view of the air release valve of FIG. 1, sectioned along section lines II-II of FIG. 1, showing the valve closure arrangement in the bottom limit position and the regulator float displaced to the first position.
Figure 4:
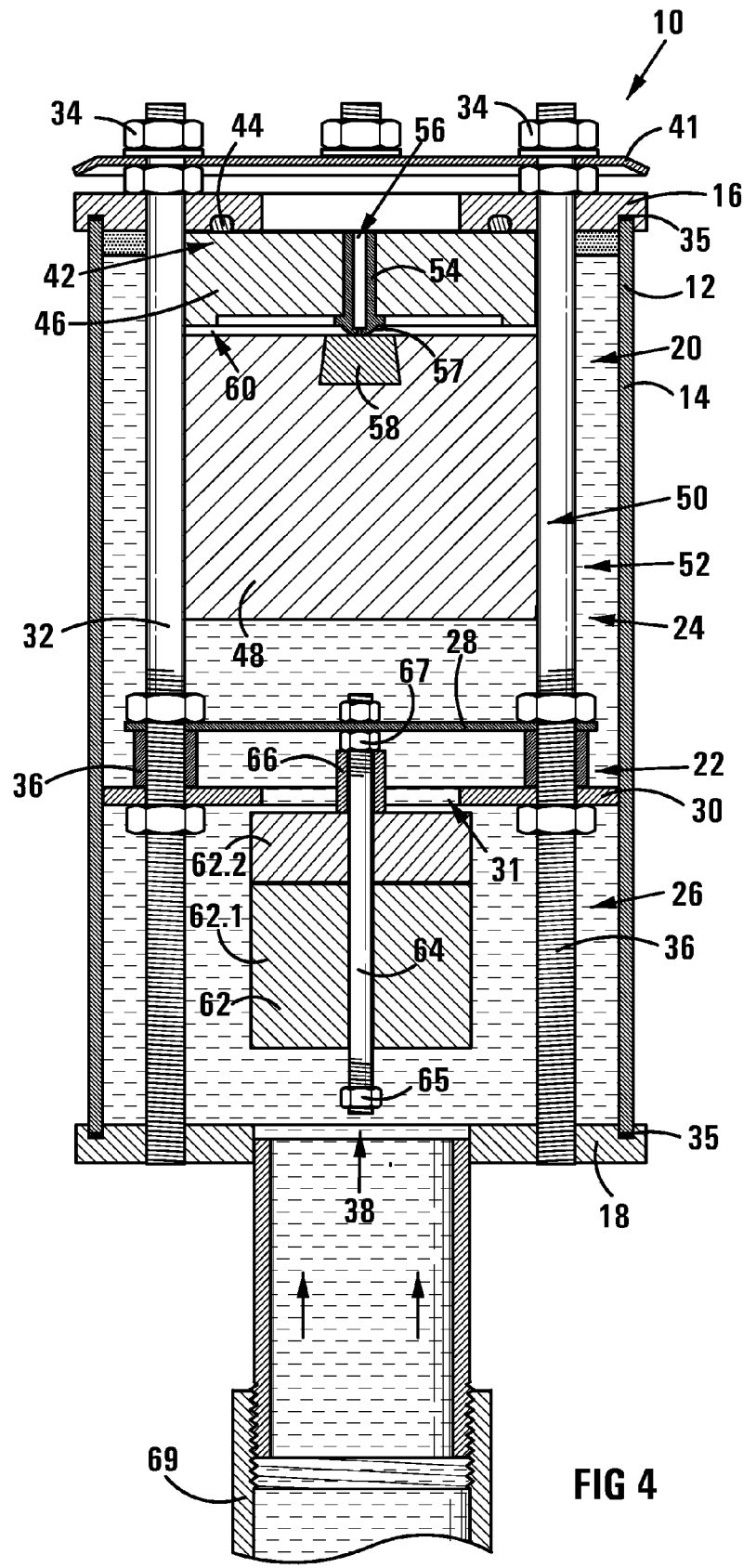
FIG. 4 shows a sectional view of the air release valve of FIG. 1, sectioned along section lines II-II of FIG. 1, showing the valve closure arrangement in the upper limit position and the regulator float displaced to the second position.

The valve closure 46 and the float 48 are axially displaceable within the upper part 24 of the internal chamber 20 defined within the valve body 12, particularly between a bottom limit position as shown in FIG. 2, as determined by the location of the baffle plate 28, and a top limit position as shown in FIG. 4, when the valve closure 46 seats against the seat 42 for blocking the outlet 40. The valve closure 46 and the float 48 are displaceable between the two limit positions in the manner described hereafter in conjunction with a description operation of the valve 10. The bolts 32 serve as guide means for guiding the axial displacement of the valve closure 46 and the float 48, it being apparent that the valve closure 46 and the float 48 are configured to define an annular passage 52 between them and the pipe section 14 for permitting fluid flow past them, as described hereafter, and as shown in the drawing by means of arrows.

Figure 5:
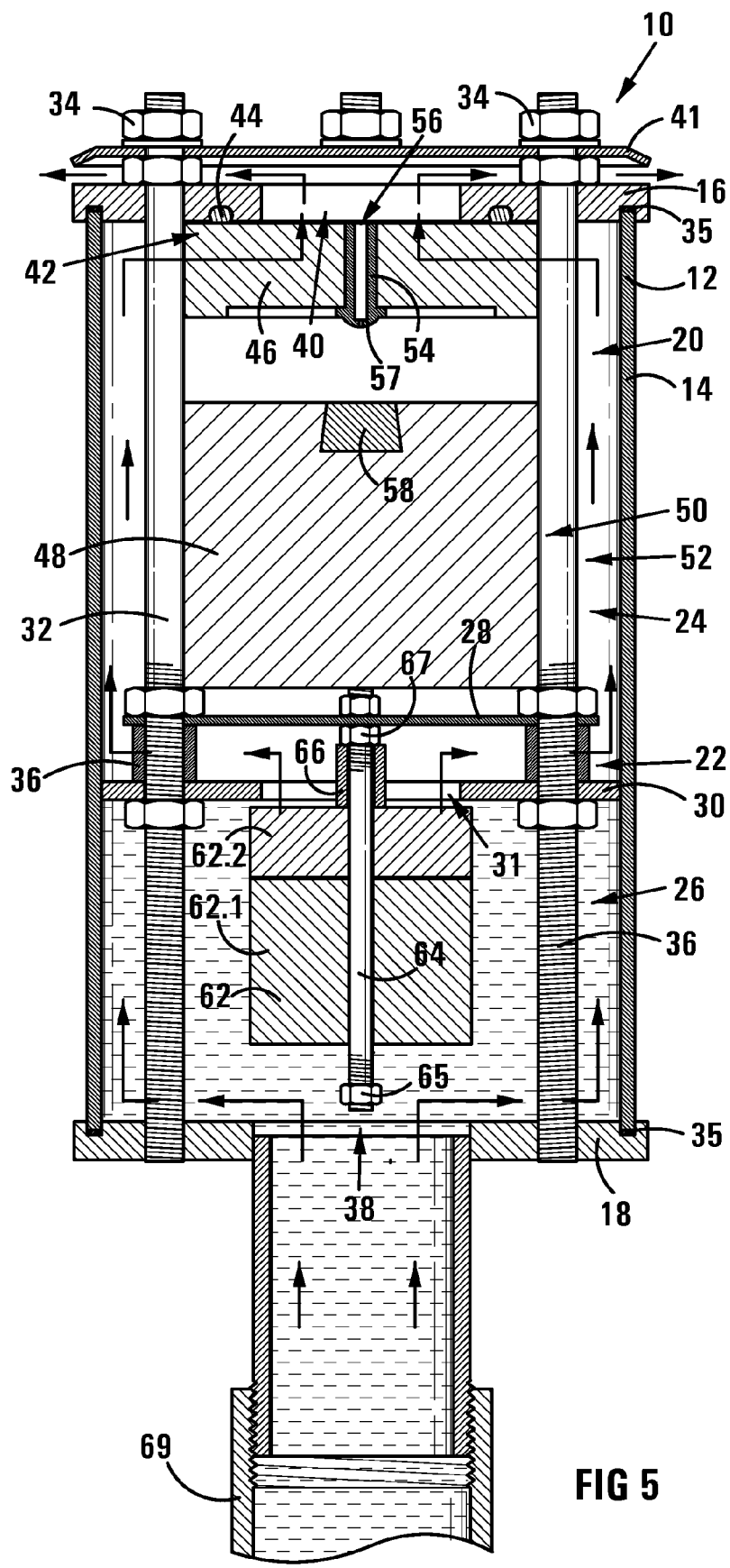
FIG. 5 shows a sectional view of the air release valve of FIG. 1, sectioned along section lines II-II of FIG. 1, showing the closure of the valve closure arrangement seated against the valve seat and the regulator float displaced to the second position.

The valve closure 46 and the float 48 typically are of polyethylene, thus both being buoyant. The valve closure 46 further includes a tubular central shaft 54 which defines an air flow passage 56 therethrough from the top to the bottom of the closure. The bottom end of the shaft 54 is tapered to define an annular seat surface 57 having an outer diameter smaller than that of the remainder of the shaft 54. The inlet of the passage 56 is defined within the annular seat surface 57. The float 48 includes in its top centre an abutment pad 58 for abutting against the annular seat surface 57 of the closure 46, thereby closing-off the inlet of the passage 56. Abutment between the float 48 and the closure 46 occurs only within an area defined by the annular seat 57, which area is small compared to the maximum cross-sectional area of the float 48 in a horizontal plane. A gap 60 is thus defined between the remainder of the top surface of the float 48 and the closure 46, said remainder comprising substantially the entire top surface of the float 48 which is thus exposed to fluid pressure in the internal chamber 20 defined within the valve body 12, be that water pressure or air pressure. As such, during abutment between the float 48 and the closure 46, the resultant upward and downward forces acting on the float 48 due to fluid pressure in the valve body 12 remains substantially equalized. It must be understood that the valve closure 46 and the float 48 are independently displaceable between positions in which they abut one another as described (and illustrated in FIGS. 2, 3 and 4) and variable positions in which they are spaced apart from one another (as shown in FIG. 5). This is again referred to hereafter.

Figure 3:
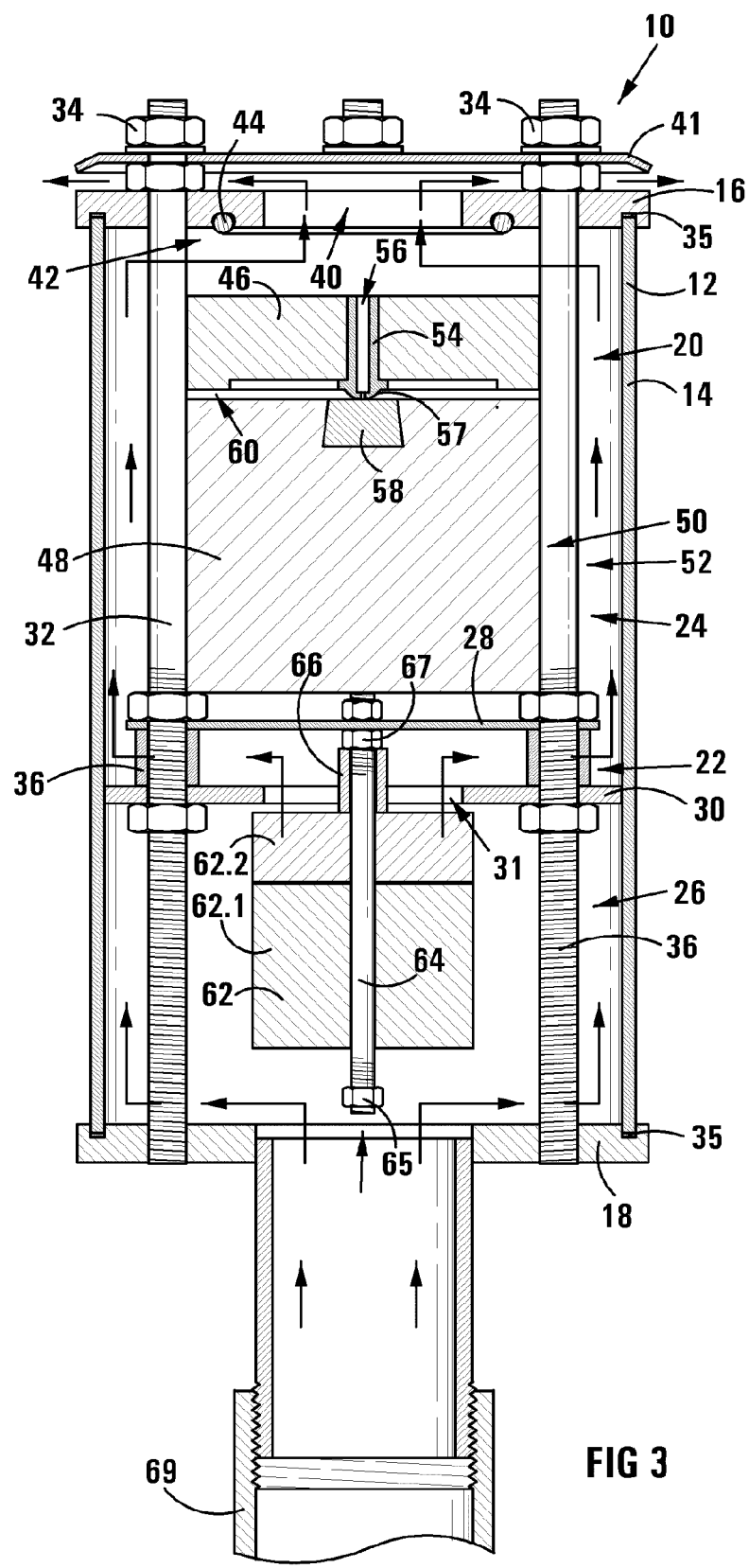
FIG. 3 shows a sectional view of the air release valve of FIG. 1, sectioned along section lines II-II of FIG. 1, showing the valve closure arrangement in the bottom limit position and the regulator float displaced to the second position.

The air release valve 10 includes also a regulator float 62 that is located in an axially displaceable configuration within the lower part 26 of the internal chamber 20, the regulator float 62 comprising a cylindrical body which is slidably located on a shaft 64 that depends from the baffle plate 28 through the aperture 31 in the baffle plate 30. The regulator float 62 is displaceable between a first position as shown in FIG. 2, which is determined by the location of a nut 65 screwed onto the shaft 64, and a second raised position as shown in FIGS. 3, 4 and 5, in which a stop formation 66 connected to the regulator float 62, abuts against a nut 67 connected to the shaft 64 as shown in FIGS. 3, 4 and 5 such that the second raised position is the uppermost position of regulator float 62. In the lower first position of the regulator float 62, substantially unrestricted fluid flow past the regulator float 62 to and through the aperture 31 defined in the baffle plate 30 is permitted, whereas in the raised second position of the regulator float 62, such flow is effectively restricted. This is again explained in more detail hereafter.

The regulator float 62 is formed of two parts 62.1 and 62.2 of different materials having different mass thereby to regulate the buoyancy of the regulator float. For example, the regulator float may be of a plastics material such as polyethylene and a metal such as stainless steel. The proportions of said materials, in use, will determine the buoyancy and thus the operational effect of the regulator valve 62. It will be appreciated that the proportions of the material will be selected to suite the operational requirements of the air release valve 10. By providing two parts, one or both of the parts can be exchanged for other parts of different mass so as to vary the effective mass of the regulator float thereby to render it suitable for use in different operating conditions requiring the regulator float to have a different mass.

Referring to FIG. 2, the valve closure arrangement is shown in the bottom limit position and the regulator float is shown in the first position. It will be apparent from FIG. 2 that with the air release valve 10 operatively connected in its vertical configuration as shown to a water pipeline 69 and with the valve closure arrangement 50 and regulator float 62 in the positions indicated, substantially unrestricted flow through the valve 10 will be permitted from the inlet 38 to the outlet 40, particularly also via a passage that is defined between the baffle plates 28 and 30 of the baffle plate arrangement 22, the fluid flow path for such fluid flow being indicated by the arrows included on the drawings.

The operation of the air release valve 10 is described hereafter, the valve 10 in its operative configuration being connected to a water pipeline 69 with the inlet 38 being in communication with the pipeline 69. Typically, the valve 10 will be connected to the pipeline 69 in the region where it defines a crest, i.e. a region from where air is to be purged from the pipeline (not shown). An initial condition is assumed in which the entire air release valve is devoid of water and filled with air as shown in FIG. 2. The float 48 is in its lower limit position and the closure 46 is seated on top of the float 48; the regulator float 62 is in its first position; and water in the pipeline 69 is advancing towards the crest in the pipeline where the valve 10 is located.

Under pressure build up from the approaching water, air in the pipeline 69 is purged therefrom via the air release valve 10 and, particularly, the valve body 12 thereof, the air following the path illustrated by the arrows included on the drawing. Under normal air flow conditions the regulator float 62 remains in its first position while the valve closure 46 remains in its position in which it rests on the float 48, as shown in FIG. 2.

Should the initial air flow through the air release valve 10 occur at an excessive rate, which could cause the valve closure 46 to be displaced into its closed position, constituting "premature closing" and potentially causing damage to the pipeline 69 with which the valve 10 is associated, the air flow past the regulator float 62 will cause it to be displaced towards its second position as shown in FIG. 3, thus greatly reducing the area through which the air passes and thus reducing the air flow through the valve 10. This will ensure that the valve closure 46 remains in its bottom limit position as shown in FIG. 3 and that "premature closing" is thus prevented. An "air cushion" simultaneously is created within the associated pipeline 69 which will reduce the water flow rate through the pipeline 69 and avoid possible water hammer effects.

With reference to FIG. 4, when water reaches the air release valve 10 under normal conditions and rises within the valve chamber 20, the position of the regulator float 62 will rise together with the water level, thus immediately restricting the flow rate through the air valve 10. As the water level continues to rise into the upper part 24 of the internal chamber 20, the float 48 will be raised together with the associated water level, thus also raising the position of the closure valve 46. As substantially all air is purged from the air release valve 10, the float 48 will be raised into a position in which the valve closure 46 is seated against the valve seat 42, thus to effectively block the outlet 40. Because of the restricted water flow through the valve 10, potential surges caused by the valve closing 46 are significantly reduced, potential water hammer damage within the pipeline 69 associated with the valve 10 closing thus being greatly reduced.

Where water flows into the valve 10 at an excessive rate, which will have been preceded by air flow through the valve 10 at an excessive rate and displacement of the regulator float 62 towards its second position, in addition to the "air cushion" effect referred to above already having "slowed down" the water flow rate, the water flow rate into the valve 10 will be reduced still further by the regulator float 62. Possible water hammer damage is thus still further reduced.

During subsequent operation of the air release valve 10 within the associated water pipeline 69, should air suspended in water or pockets of air in the pipeline 69 collect in the crest region where the valve 10 is located and hence enter the valve 10 via the inlet 38, this air will collect in the operative top part 24 of the internal chamber 20 defined within the valve body 12. As additional air collects in this region, the float 48 will drop under the force of gravity while the closure 46 will maintain its seated position against the seat 42 as shown in FIG. 5, permitting air to escape from the air release valve via the passage 56 and the outlet 40. The closure 46 particularly maintains its raised position as described for as long as the air pressure within the valve body 12 sufficiently exceeds the atmospheric pressure that acts thereon via the outlet 40 defined by the top wall 16 of the valve body 12.

As air escapes from the valve 10 via the passage 56, the water level in the valve body 12 may rise sufficiently to cause the float 48 to be raised again. It is thus apparent that the float 48 will normally tend to oscillate, the amplitude of oscillation being variable and being determined, inter-alia, by the rate at which air from the pipeline 69 enters the valve 10.

It will be appreciated that the operation of the valve closure arrangement 50 of the air release valve 10 is essentially conventional, the operation of the regulator float 62 serving to control flow through the valve 10 to the extent that potential water hammer problems are largely eliminated. It is envisaged in this regard that the effective mass of the regulator float 62 can be varied by selecting and providing components 62.1 and 62.2 of differing mass, thus to permit the air release valve to operate within different flow situations associated with water pipelines.

In a situation in which the pipeline 69 associated with the air release valve 10 "empties", the regulator float 62, float 48 and the valve closure 46 will drop to their lowermost positions, as shown in FIG. 2, allowing free air flow into the pipeline 69 via the valve 10 and preventing vacuums from forming in the pipeline 69, which also could cause pipeline 69 damage.

Insofar as the configuration of the air release valve 10 clearly is greatly variable, the invention extends also to all such variations of the air release valve which can be envisaged.

The invention claimed is:

1. An air release valve which includes, in its operative upright configuration, an elongate valve body defining an internal chamber therein along a longitudinal axis thereof between a top wall, that defines an outlet and a valve seat surrounding the outlet, and a bottom wall, that defines an inlet connectable in communication with a water pipeline, the body having a baffle plate arrangement located therein that divides the internal chamber into a top part and a bottom part and that defines a passage which provides for fluid communication between the parts;

a valve closure arrangement including a float and a closure that are located for axial displacement within the top part of the internal chamber and that are configured to permit fluid flow from the passage defined by the baffle plate arrangement past the float and the closure, the float and the closure being displaceable between an upper limit position, in which the closure blocks the outlet defined by the top wall of the valve body by seating against the valve seat and the float bears against the closure, and a bottom limit position, in which the closure and the float are displaced away from the outlet; and a regulator float that is located for axial displacement within the bottom part of the internal chamber and that is configured to permit fluid flow from the inlet defined by the bottom wall of the valve body past the regulator float to the passage defined by the baffle plate arrangement, the regulator float being displaceable between a first lower position, in which substantially free flow through the passage defined by the baffle plate arrangement is permitted, and a second uppermost position, in which the fluid flow through the passage is restricted, but not blocked; and regulator float guide means for guiding the axial displacement of the regulator float between the first lower position and the second uppermost position of the regulator float, the regulator float guide means including a first stop determining the first lower position of the regulator float and a second stop determining the second uppermost position of the regulator float.

2. The air release valve as in claim 1, in which the configuration of the float and of the closure of the valve closure arrangement is such that with the float abutting the closure, abutment occurs within an area which is relatively small compared to the maximum cross-sectional area of the float in a horizontal plane, providing for substantially the entire top surface of the float to be exposed to fluid pressure acting in the passage in the valve.

3. The air release valve as in 1, wherein the regulator float comprises two parts which are of different mass and which are removably connected to one another.

4. The air release valve as in claim 1, wherein the regulator float guide means comprises a shaft on which the regulator float is slidably displaceable and which extends from the top baffle plate of the baffle plate arrangement operatively downwards through the aperture in the bottom baffle plate and into the bottom part of the internal chamber defined within the valve body.

5. The air release valve as in claim 4, in which the first stop is located at the operative free end of the shaft and the second stop is located on the shaft intermediate the first stop and the top baffle plate.

6. The air release valve as in claim 1, in which the elongate valve body includes an elongate pipe-like section within which the internal chamber is defined and which has plate elements secured at opposite ends thereof that form, respectively, the top wall and the bottom wall of the valve body, thereby to define a cylindrical internal chamber.

7. The air release valve as in claim 6, in which the elongate valve body includes closure arrangement guide means for guiding the axial displacement of the float and of the closure of the valve closure arrangement, the float and the closure being configured to define an annular space around them for fluid flow from the baffle plate arrangement to the outlet defined in the top wall of the valve body.

8. The air release valve as in claim 6, in which the baffle plate arrangement includes a pair of plates located in a substantially parallel, spaced configuration within the pipe-like section, substantially perpendicular to the longitudinal axis of the valve body, the pair of plates including an operative upper plate in the form of a circular disc having a diameter smaller than the diameter of the pipe section, and an operative lower plate, in the form of a circular disc that spans the pipe section and that defines a central aperture therethrough, whereby in use, the baffle plate arrangement and pipe-line section defines a passage through which fluid flows through the central aperture defined in the bottom plate of the baffle plate arrangement, then radially outwardly between the plates and then upwardly through an annular space defined between an outer perimeter of the upper plate and the pipe-like section.

9. The air release valve as in claim 8, in which the regulator float of the air release valve has a cylindrical configuration and a diameter larger than the diameter of the aperture that is defined in the lower baffle plate, the second uppermost position of the regulator float restricting fluid flow through the aperture in the lower baffle plate.

10. The air release valve as in claim 8, in which the elongate valve body includes closure arrangement guide means for guiding the axial displacement of the float and of the closure of the valve closure arrangement, the float and the closure being configured to define an annular space around them for fluid flow from the baffle plate arrangement to the outlet defined in the top wall of the valve body.

11. The air release valve as in claim 8, in which the bottom limit position of the closure and the float is determined by the position of the top baffle plate, with the float resting on the top baffle plate in said bottom limit position.

12. The air release valve as in claim 11, in which the configuration of the float and of the closure of the valve closure arrangement is such that with the float abutting the closure, abutment occurs within an area which is relatively small compared to the maximum cross-sectional area of the float in a horizontal plane, providing for substantially the entire top surface of the float to be exposed to fluid pressure acting in the passage in the valve.

13. The air release valve as in claim 12, in which the closure defines an air flow passage defined between the operative top and bottom of the closure, the passage having an inlet within said area within which abutment occurs between the float and the closure, and an outlet that communicates with the atmosphere via the outlet defined by the top wall of the valve body.

14. The air release valve as in claim 13, in which the regulator float of the air release valve has a cylindrical configuration and a diameter larger than the diameter of the aperture that is defined in the lower baffle plate, the second uppermost position of the regulator float restricting fluid flow through the aperture in the lower baffle plate.

15. An air release valve which includes, in its operative upright configuration, an elongate valve body defining an internal chamber therein along a longitudinal axis thereof between a top wall, that defines an outlet and a valve seat surrounding the outlet, and a bottom wall, that defines an inlet connectable in communication with a water pipeline, the body having a baffle plate arrangement located therein that divides the internal chamber into a top part and a bottom part and that defines a passage which provides for fluid communication between the parts;
  a valve closure arrangement including a float and a closure that are located for axial displacement within the top part of the internal chamber and that are configured to permit fluid flow from the passage defined by the baffle plate arrangement past the float and the closure, the float and the closure being displaceable between an upper limit position, in which the closure blocks the outlet defined by the top wall of the valve body by seating against the valve seat and the float bears against the closure, and a bottom limit position, in which the closure and the float are displaced away from the outlet;
  a regulator float that is located for axial displacement within the bottom part of the internal chamber and that is configured to permit fluid flow from the inlet defined by the bottom wall of the valve body past the regulator float to the passage defined by the baffle plate arrangement, the regulator float being displaceable between a first position, in which substantially free flow through the passage defined by the baffle plate arrangement is permitted, and a second position, in which the fluid flow is restricted;
  wherein the elongate valve body includes an elongate pipe-like section within which the internal chamber is defined and which has plate elements secured at opposite ends thereof that form, respectively, the top wall and the bottom wall of the valve body, thereby to define a cylindrical internal chamber;
  wherein the baffle plate arrangement includes a pair of plates located in a substantially parallel, spaced configuration within the pipe-like section, substantially perpendicular to the longitudinal axis of the valve body, the pair of plates including an operative upper plate in the form of a circular disc having a diameter smaller than the diameter of the pipe section, and an operative lower plate, in the form of a circular disc that spans the pipe section and that defines a central aperture therethrough, whereby in use, the baffle plate arrangement and pipe-line section defines a passage through which fluid flows through the central aperture defined in the bottom plate of the baffle plate arrangement, then radially outwardly between the plates and then upwardly through the annular space defined between an outer perimeter of the upper plate and the pipe-like section; and
  wherein the elongate valve body includes closure arrangement guide means for guiding the axial displacement of the float and of the closure of the valve closure arrangement, the float and the closure being configured to define an annular space around them for fluid flow from the baffle plate arrangement to the outlet defined in the top wall of the valve body.

16. The air release valve as in claim 15, in which the configuration of the float and of the closure of the valve closure arrangement is such that with the float abutting the closure, abutment occurs within an area which is relatively small compared to the maximum cross-sectional area of the float in a horizontal plane, providing for substantially the entire top surface of the float to be exposed to fluid pressure acting in the passage in the valve.

17. The air release valve as in claim 15, in which the air release valve includes regulator float guide means for guiding the axial displacement of the regulator float; and
  wherein the regulator float guide means comprise a shaft on which the regulator float is slidably displaceable and which extends from the top baffle plate of the baffle plate arrangement operatively downwards through the aperture in the bottom baffle plate and into the bottom part of the internal chamber defined within the valve body.

18. The air release valve as in claim 15, in which the regulator float of the air release valve has a cylindrical configuration and a diameter larger than the diameter of the aperture that is defined in the lower baffle plate, the second position of the regulator float restricting fluid flow through the aperture in the lower baffle plate.

\* \* \* \* \*

UNITED STATES PATENT AND TRADEMARK OFFICE
CERTIFICATE OF CORRECTION

PATENT NO. : 8,689,821 B2  
APPLICATION NO. : 12/920814  
DATED : April 8, 2014  
INVENTOR(S) : Miller Page 1 of 1

It is certified that error appears in the above-identified patent and that said Letters Patent is hereby corrected as shown below:

In the Claims:

Claim 3, Column 8, Line 43, insert -- claim -- before the numeral 1;

Claim 15, Column 10, Lines 34-35, delete "pipe-line" and insert -- pipe-like -- therefor.

Signed and Sealed this
Twenty-fourth Day of June, 2014

Michelle K. Lee
*Deputy Director of the United States Patent and Trademark Office*